(12) United States Patent
Oomori et al.

(10) Patent No.: US 11,934,639 B2
(45) Date of Patent: Mar. 19, 2024

(54) ADAPTIVE INTERFACE PROVIDING APPARATUS, ADAPTIVE INTERFACE PROVIDING METHOD, AND PROGRAM

(71) Applicant: NIPPON TELEGRAPH AND TELEPHONE CORPORATION, Tokyo (JP)

(72) Inventors: Kumiko Oomori, Tokyo (JP); Yuuki Shiroma, Tokyo (JP); Kazushige Nakamura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/981,685

(22) PCT Filed: Mar. 26, 2019

(86) PCT No.: PCT/JP2019/012950
§ 371 (c)(1),
(2) Date: Sep. 16, 2020

(87) PCT Pub. No.: WO2019/189227
PCT Pub. Date: Oct. 3, 2019

(65) Prior Publication Data
US 2021/0034208 A1    Feb. 4, 2021

(30) Foreign Application Priority Data

Mar. 27, 2018 (JP) ................................ 2018-060718
Jul. 17, 2018 (JP) ................................ 2018-134390

(51) Int. Cl.
*G06F 3/0484* (2022.01)
*G06F 9/451* (2018.01)

(52) U.S. Cl.
CPC ............ *G06F 3/0484* (2013.01); *G06F 9/451* (2018.02)

(58) Field of Classification Search
CPC ........ G06F 3/0484; G06F 9/451; G06F 9/453; G06F 3/04895; G06F 3/038; G06F 3/023; G06F 3/0481
See application file for complete search history.

(56) References Cited

U.S. PATENT DOCUMENTS 5,535,321 A * 7/1996 Massaro ................. G06F 9/453
715/810
2006/0050865 A1* 3/2006 Kortum ................... G06F 9/453
379/265.07

(Continued)

FOREIGN PATENT DOCUMENTS

JP          08055103 A  *  2/1996
JP          H08-055103     2/1996

(Continued)

*Primary Examiner* — Daniel W Parcher

(57) ABSTRACT

There is provided an adaptive interface providing apparatus which has a manipulation unit for receiving a request from a user and provides an interface to be displayed on the manipulation unit that comprises a proficiency index calculating unit configured to calculate a proficiency index of the user based on a manipulation log of the user; and an interface providing unit configured to generate an interface suitable for the user based on a manipulation log of each user and the proficiency index and to display the interface on the manipulation unit.

11 Claims, 7 Drawing Sheets

| PRO-FICIENCY INDEX | UI TYPE | UI FEATURE (TASK TO RECEIVE ORDER RECEPTION INFORMATION FROM A CUSTOMER AND INPUT THE CONTENT) |
|---|---|---|
| 1 | UI1 | UNDERSTANDING THE BUSINESS (EXPLANATION OF THE MEANING OF INPUT ITEMS) |
| 2 | UI2 | IMPROVING MANIPULATION ACCURACY (INPUT EXAMPLE, CORRELATION WITH ANOTHER INPUT) |
| 3 | UI3 | IMPROVING MANIPULATION EFFICIENCY (INPUT ASSISTANCE, CHANGE OF INPUT ORDER) |

(56) References Cited

U.S. PATENT DOCUMENTS

| | | | | |
|---|---|---|---|---|
| 2006/0075360 A1* | 4/2006 | Bixler | ................ | G06F 3/04842 |
| | | | | 715/805 |
| 2007/0166672 A1* | 7/2007 | Morita | ................... | G09B 19/00 |
| | | | | 434/323 |
| 2007/0277104 A1* | 11/2007 | Hennum | ................. | G06F 9/453 |
| | | | | 715/705 |
| 2013/0159228 A1* | 6/2013 | Meijer | ................... | G06N 20/00 |
| | | | | 706/14 |
| 2015/0186153 A1* | 7/2015 | Voronkov | ............ | G06F 3/0481 |
| | | | | 715/708 |

FOREIGN PATENT DOCUMENTS

| | | | | |
|---|---|---|---|---|
| JP | H11-213022 | 8/1999 | | |
| JP | 2003-015798 | 1/2003 | | |
| JP | 2004-355392 | 12/2004 | | |
| JP | 2017-033387 | 2/2017 | | |
| JP | 2017-138881 | 8/2017 | | |
| WO | WO 2012/144140 | 10/2012 | | |
| WO | WO-2012144140 A1 * | 10/2012 | ............ | G06F 3/048 |

\* cited by examiner

FIG.4

| OPERATOR ID | TASK ID | PROFICIENCY INDEX |
|---|---|---|
| IDa | Ta | 4 |
| IDa | Tb | 2 |
| IDb | Ta | 3 |

FIG.5

| PROFICIENCY INDEX | UI TYPE | UI FEATURE (TASK TO RECEIVE ORDER RECEPTION INFORMATION FROM A CUSTOMER AND INPUT THE CONTENT) |
|---|---|---|
| 1 | UI1 | UNDERSTANDING THE BUSINESS (EXPLANATION OF THE MEANING OF INPUT ITEMS) |
| 2 | UI2 | IMPROVING MANIPULATION ACCURACY (INPUT EXAMPLE, CORRELATION WITH ANOTHER INPUT) |
| 3 | UI3 | IMPROVING MANIPULATION EFFICIENCY (INPUT ASSISTANCE, CHANGE OF INPUT ORDER) |

FIG.6

| OPERATOR ID | PROFICIENCY INDEX | TASK ID | EVENT ID | LOG INFORMATION (TIME INTERVAL OF KEY MANIPULATIONS) |
|---|---|---|---|---|
| IDa | 1 | Ta | Q1 | t1,t2,t3 |
| | | | Q2 | t5,t6 |
| | | | Q3 | t7,t8,t9,t10 |

|  | 50% VALUE | 90% VALUE |
|---|---|---|
| BEGINNER | 3.7 SECONDS | 13.5 SECONDS |
| EXPERT | 2 SECONDS | 4 SECONDS |

|  | AVERAGE VALUE | VARIANCE VALUE | PROFICIENCY INDEX |
|---|---|---|---|
| BEGINNER | 5.8 | 11.8 | 1 |
| EXPERT | 2.4 | 4.2 | 5 |

ADAPTIVE INTERFACE PROVIDING APPARATUS, ADAPTIVE INTERFACE PROVIDING METHOD, AND PROGRAM

CROSS-REFERENCE TO RELATED APPLICATIONS

This application is a U.S. 371 Application of International Patent Application No. PCT/JP2019/012950, filed on 26 Mar. 2019, which application claims priority to and the benefit of JP Application No. 2018-060718, filed on 27 Mar. 2018, and JP Application No. 2018-134390, filed on 17 Jul. 2018, the disclosures of which are hereby incorporated herein by reference in their entireties.

TECHNICAL FIELD

The present invention relates to a general manipulation of an operator in operation work for performing a manipulation based on a request from a user, and relates to a technique for providing an operator with an appropriate operator manipulation interface. The operation work also applies to the case where the work is shared by a plurality of people.

BACKGROUND ART

For example, Patent Literature 1 or Patent Literature 2 discloses a technology as a prior art that relates to an operator manipulation interface for displaying to the operator performing input/output manipulation of information by using a computer or the like. The "operator manipulation interface" may be referred to as "interface", "user interface", "UI", or the like. In the following, "interface" is mainly used.

Patent Literature 1 discloses a technique for determining user proficiency level in the interface by objectively determining a skill level of an operator based on the time intervals of key manipulations. Patent Literature 2 discloses a method of providing an appropriate interface by switching the manipulation mask information according to the manipulation level of the operator.

CITATION LIST

Patent Literature

Patent Literature 1: Japanese Patent Application Publication No. H8-55103
Patent Literature 2: Japanese Patent Application Publication No. 2003-15798

SUMMARY OF INVENTION

Technical Problem

The input/output manipulation of the operator becomes skilled through time and training by a veteran staff-person, and even an expert may risk an incident due to an input mistake. Furthermore, an operator is required to perform quick and accurate input/output manipulation to improve work efficiency.

In Patent Literature 1 and 2 described above, the knowledge about the operator is obtained from a manipulation log. In Patent Literature 1, the skill level of an operator can be objectively determined by determining the skill level based on the time intervals of key manipulations, however, the interface to be assigned to the operator is not described. Patent Literature 2 discloses a method of switching the manipulation mask information according to the manipulation level of the operator in which the manipulation level of the operator is measured by referring to the comparison result of the key input content and the list of manipulable keys and the speed and stability of the key input pitch. However, in Patent Literature 2, it is necessary to prepare a manipulation mask for switching, i.e. an interface, in advance.

The present invention has been made in view of the above points, and an object of the present invention is to provide a technique that enables dynamically generating and assigning an interface to be displayed to the user based on the manipulation log of the user.

Solution to Problem

According to the disclosed technique, there is provided an adaptive interface providing apparatus which has a manipulation unit for receiving a request from a user and provides an interface to be displayed on the manipulation unit that comprises a proficiency index calculating unit configured to calculate a proficiency index of the user based on a manipulation log of the user; and an interface providing unit configured to generate an interface suitable for the user based on a manipulation log of each user and the proficiency index and to display the interface on the manipulation unit.

Advantageous Effects of Invention

According to the disclosed technique, a technique is provided that enables dynamically generating and assigning an interface to be displayed to the user based on the manipulation log of the user.

BRIEF DESCRIPTION OF DRAWINGS

FIG. 4 shows an example of data stored in the proficiency index storage unit.
FIG. 5 shows an example of data stored in the UI generation unit.
FIG. 6 shows an example of data stored in the log file storage unit.

DESCRIPTION OF EMBODIMENTS

Figure 1:
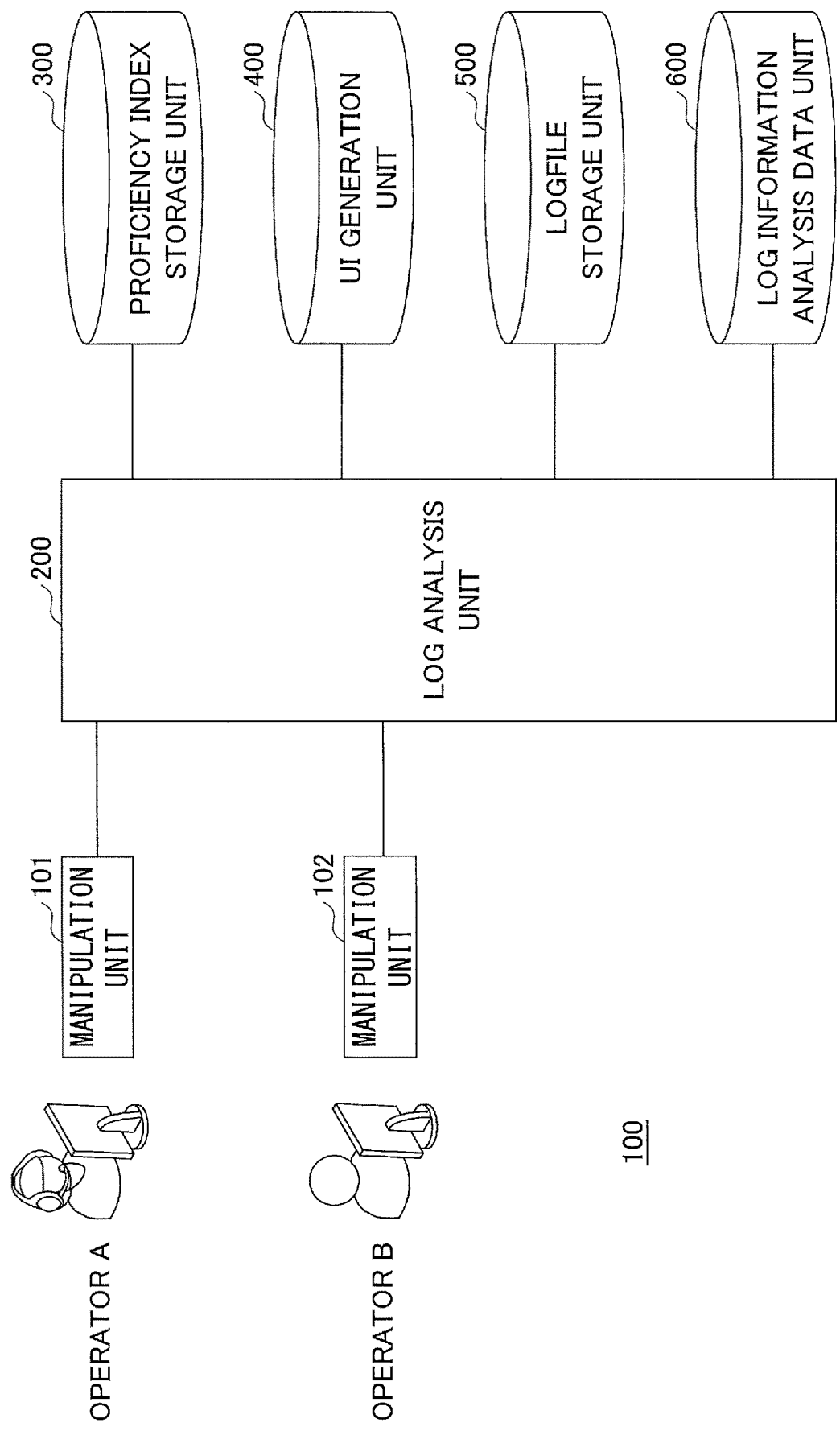
FIG. 1 shows a configuration diagram of the adaptive interface providing apparatus in an embodiment of the present invention.

Hereinafter, an embodiment of the present invention (the present embodiment) will be described with reference to the drawings. The embodiments described below are merely examples, and the embodiments to which the present invention is applied are not limited to the following embodiments.

(Outline of Embodiment)

First, the outline of the present embodiment will be described. In the present embodiment, an adaptive interface providing apparatus is disclosed that improves the work efficiency of an operator by changing the interface according to the proficiency level of an operator performing the input/output manipulation of information daily using a computer or the like. The operator may be referred to as a user.

The adaptive interface providing apparatus collects the manipulation log for each operator in the backyard, calculates a proficiency index based on the collected manipulation log, and provides an interface based on the calculated proficiency index and the manipulation log. For example, an operator with a low proficiency index is provided with an interface for supporting the skill of work and manipulation of the operator such as by displaying annotations related to operation work. Meanwhile an operator with a high proficiency index is provided with an interface for improving the work skill and efficiency of the operator by providing the interface enhancing the efficiency of the manipulation. Although the proficiency index is an index representing the skill level, the skill level may also be used to mean the proficiency index.

The manipulation log previously described includes, for example, for each event when executing a task, a time interval of key manipulations, an input order of items, an elapsed time from one input item to the next input item, an input content and the number of errors, or the like. The proficiency index based on objective evaluation can be obtained by using the manipulation log.

Furthermore, in addition to the manipulation log described above, a key manipulation (input, deletion, screen movement, copy, etc.), a mouse manipulation, an input order, and omission of essential input items (fields) may be used as an object. Also, in case of division of labor, questions, inquiries, and request to redo work from the operators before and after the division of labor (pre-process operator, post-process operator, etc.) or the like may be used as an object. Regarding the essential input items described above, for input items having a correlation with each other, such as, when an input is made for a certain item, an input for another item is determined, requesting the correlation may be used as an object of the manipulation log.

Furthermore, in the present embodiment, by classifying the interfaces described above into support for understanding business, support for improving manipulation accuracy, and support for improving manipulation efficiency, then generating and assigning the interfaces according to proficiency index and past manipulation log, an interface according to the proficiency level can be provided so the work efficiency of the whole operator can be improved.

(System Configuration)

FIG. 1 shows a functional configuration diagram of the adaptive interface providing apparatus 100 in an embodiment of the present invention. As an example, the adaptive interface providing apparatus 100 in FIG. 1 analyzes the manipulation logs of operator A and operator B who execute the same task and calculates the skill level of each operator. Then by providing an interface corresponding to the calculated skill, the apparatus can improve the task execution efficiency of the whole operator.

As shown in FIG. 1, the adaptive interface providing apparatus 100 according to the present embodiment includes manipulation units 101, 102, a log analysis unit 200, a proficiency index storage unit 300, a UI generation unit 400, a log file storage unit 500, and a log information analysis data unit 600.

Each of the manipulation units 101, 102 is a manipulation unit of the operator A and the operator B, and includes, for example, a keyboard, a mouse, and other input devices of a computer.

The log analysis unit 200 is a functional unit that analyzes the manipulation log of the operator and calculates the proficiency index of the operator or the like. An object of analysis in the present embodiment is, for example, a correlation value of a frequency distribution of time between manipulations, which is correlated with the thinking of the operator, and the number of errors may be further added.

The proficiency index storage unit 300 is a storage unit that stores the proficiency index for each task of the operator. The proficiency index stored in the proficiency index storage unit 300 is updated when the proficiency index of the operator is changed. Furthermore, an operator who does not have a proficiency index (an operator who uses the present system for the first time) may be given a proficiency index of a beginner, or the proficiency index of the operator may be registered in advance in the proficiency index storage unit 300. By registering the proficiency index of the operator in the proficiency index storage unit 300 in advance, even an operator using the present system for the first time can generate a UI according to the proficiency index of the operator.

The UI generation unit 400 is a functional unit that generates a UI corresponding to the proficiency index. The log file storage unit 500 is a storage unit that temporarily stores a manipulation log of the operator, and the manipulation log is used for log analysis. The log information analysis data unit 600 stores data used when calculating the proficiency index of the operator.

(Example of Hardware Configuration)

The adaptive interface providing apparatus 100 previously described may be realized by, for example, causing a computer to execute a program describing the processing content described in the present embodiment.

In other words, the adaptive interface providing apparatus 100 may be realized by executing a program corresponding to the process by the adaptive interface providing apparatus 100, using hardware resources such as a CPU and a memory or the like built in a computer. The program may be recorded in a computer-readable storage medium (portable memory or the like) and may be stored or distributed. Furthermore, the program may be provided through a network such as the Internet or electronic mail.

Figure 2:
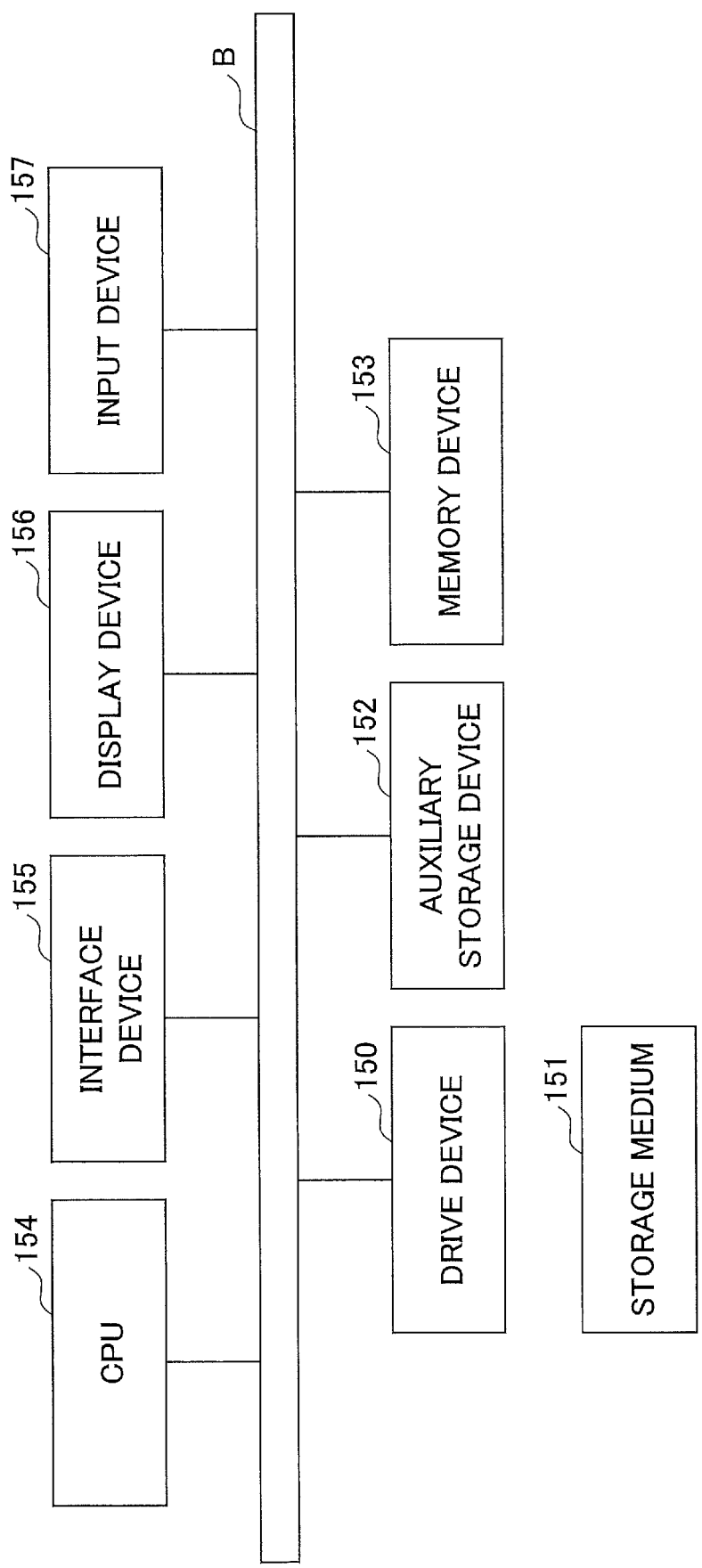
FIG. 2 shows a hardware configuration example of the adaptive interface providing apparatus.

FIG. 2 shows a hardware configuration example of the computer of the present embodiment. The computer shown in FIG. 2 includes a drive device 150, an auxiliary storage device 152, a memory device 153, a CPU 154, an interface device 155, a display device 156, an input device 157 and the like which are connected to each other by a bus B.

The program realizing the processing in the computer is provided by a storage medium 151 such as a CD-ROM or a memory card. When the storage medium 151 storing the program is set in the drive device 150, the program is installed in the auxiliary storage device 152 from the storage medium 151 via the drive device 150. However, it is not always necessary to install the program from the storage medium 151, and the program may be downloaded from another computer via the network. The auxiliary storage device 152 stores the installed program and also stores necessary files, data, and the like.

The memory device 153 reads the program from the auxiliary storage device 152 and stores the program when a program is instructed to activate. According to the program stored in the memory device 153, the CPU 154 realizes the function related to the adaptive interface providing apparatus 100. The interface device 155 is used as an interface for connecting to a network. The display device 156 displays a GUI (Graphical User Interface) or the like for the program. The input device 157 includes a keyboard, a mouse, a button, a touch panel, or the like, and is used to input various manipulation instructions. The configuration including the display device 156 and the input device 157 is an example of the manipulation unit.

(An Example of an Operation of the Adaptive Interface Providing Apparatus 100)

Figure 3:
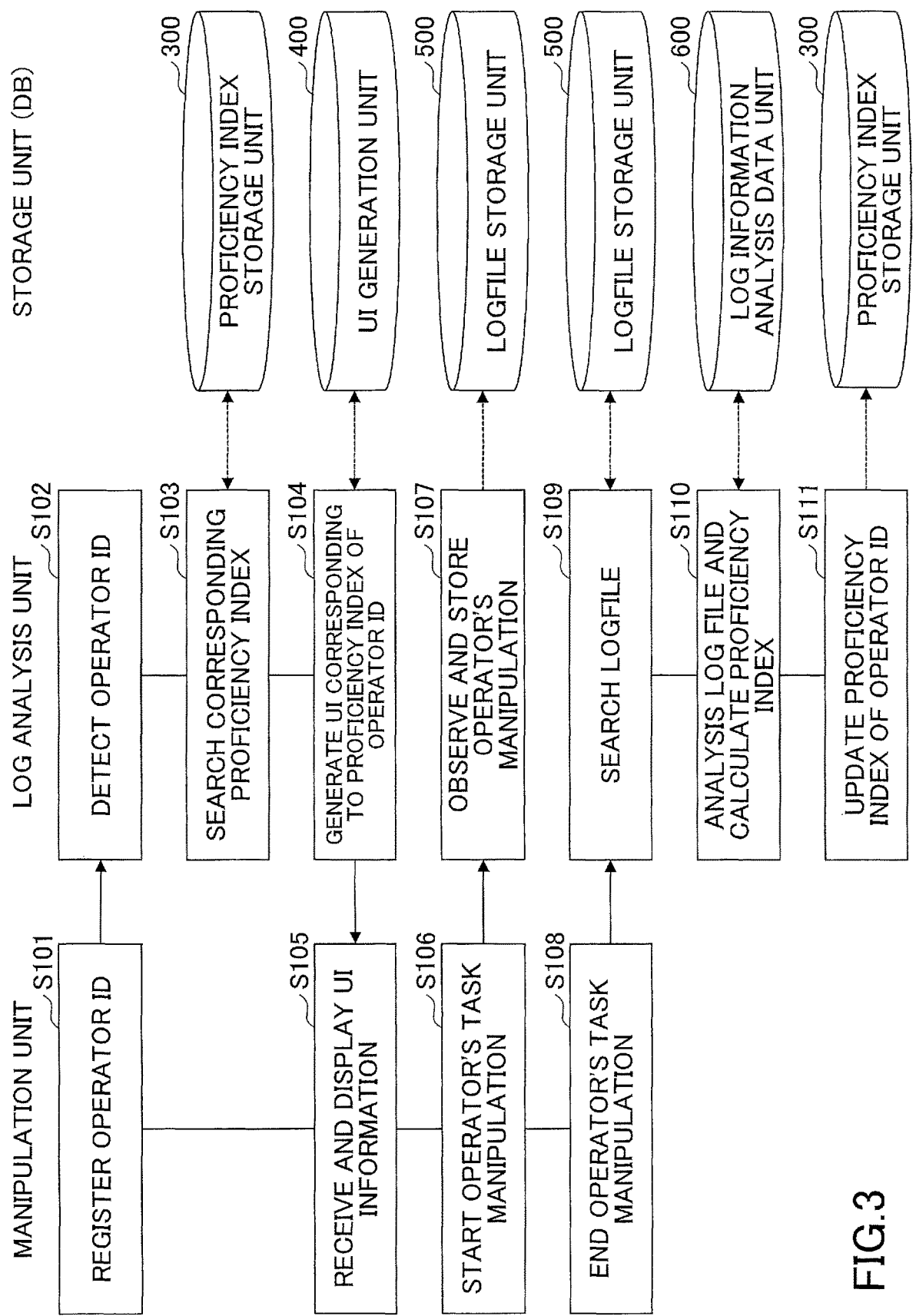
FIG. 3 shows a flow chart for explaining the operation of the adaptive interface providing apparatus.

An operation example of the adaptive interface providing apparatus 100 having the functional configuration shown in FIG. 1 will be described with reference to the flowchart of FIG. 3. Hereinafter, as an example, the description focuses on the manipulation by the manipulation unit 101, of the manipulation units 101 and 102.

In S101, the operator registers an ID from the manipulation unit 101 to the log analysis unit 200. The log analysis unit 200 detects the operator ID in S102, then searches and acquires the proficiency index corresponding to the operator ID from the proficiency index storage unit 300 in S103. An operator who does not have a proficiency index (an operator who uses the present system for the first time) may be given a proficiency index of a beginner, or the proficiency index of the operator may be registered in advance in the proficiency index storage unit 300. By registering the proficiency index of the operator in the proficiency index storage unit 300 in advance, even an operator using the present system for the first time can generate a UI according to the proficiency index of the operator.

FIG. 4 shows an example of data stored in the proficiency index storage unit 300. As shown in FIG. 4, the proficiency index storage unit 300 stores the proficiency index of the task (identified by the task ID) processed by the operator (identified by the operator ID).

The proficiency index is created, for example, based on the frequency distribution of the time between manipulations by setting an experimental task using spreadsheet software as a task and observing the events (mouse-down, key-up, etc.) from the start to the end of the task. Furthermore, when the key is manipulated more than a predetermined number of times on the same event in the frequency distribution, it may be used as sub information of the proficiency index as a manipulation error.

Next, the log analysis unit 200 makes the UI generation unit 400 generate an interface corresponding to the proficiency index of the operator ID in S104, and displays the generated interface on the manipulation unit 101 in S105.

FIG. 5 shows an example of data held in the UI generation unit 400. As shown in FIG. 5, the UI generation unit 400 holds the UI type corresponding to the proficiency index. Consequently, the UI generation unit 400 generates a UI having features corresponding to the proficiency index of the operator designated by the log analysis unit 200. As will be described later, the UI generation unit 400 generates a group of interface candidates from the manipulation log of the operator stored in the log file storage unit 500, determines an interface corresponding to the proficiency index from the group of candidates, and displays the interface on the manipulation unit 101.

The example shown in FIG. 5 is an example related to a task to receive order reception information from a customer and input the content. FIG. 5 describes UI features for each UI type. For example, the group of candidates is classified into three types of UI1 to UI3 as shown in FIG. 5, and the UI generation unit 400 determines a candidate corresponding to the proficiency index of the operator as the interface to be used.

As shown in FIG. 5, UI1 is a UI to be displayed to an operator with a proficiency index of 1, and includes, for example, content that supports for understanding a business (explanation of the meaning of input items). UI2 is a UI to be displayed to an operator with a proficiency index of 2, and includes, for example, content that supports for improving manipulation accuracy (input example, correlation with another input). UI3 is a UI to be displayed to an operator with a proficiency index of 3, and includes, for example, content that supports for improving manipulation efficiency (input assistance, change of input order). The content of the UI is defined for each task processed by the operator.

Next, the operator starts the task manipulation in S106, the log analysis unit 200 observes the manipulation content of the operator, and stores the manipulation content in the log file storage unit 500 in S107.

FIG. 6 shows an example of data stored in the log file storage unit 500. As shown in FIG. 6, the log file storage unit 500 stores an operator ID, a proficiency index of the operator, a task ID corresponding to the proficiency index, an event ID corresponding to the task ID, and log information (time interval of key manipulations) at the time of executing the event. Furthermore, as was previously described, as log information at the time of executing the event, a key manipulation (input, deletion, screen movement, copy, etc.), a mouse manipulation, an input order, and omission of essential input items (fields) may be stored. Also, in case of division of labor, questions, inquiries, and request to redo work from the operators before and after (pre-process operator, post-process operator, etc.) or the like may be stored.

At the end of the task by the operator in S108, the log analysis unit 200 searches a log file that the operator completed by using the operator ID as a key in S109. Then the log analysis unit 200 acquires the log file from the log file storage unit 500 and calculates the proficiency index using an analysis algorithm stored in the log information analysis data unit 600 in S110. For example, the log information analysis data unit 600 stores an equation for calculating a proficiency index, which will be described later.

Hereinafter, an example of the method of calculating the proficiency index executed by the log analysis unit 200 will be described.

Figure 7:
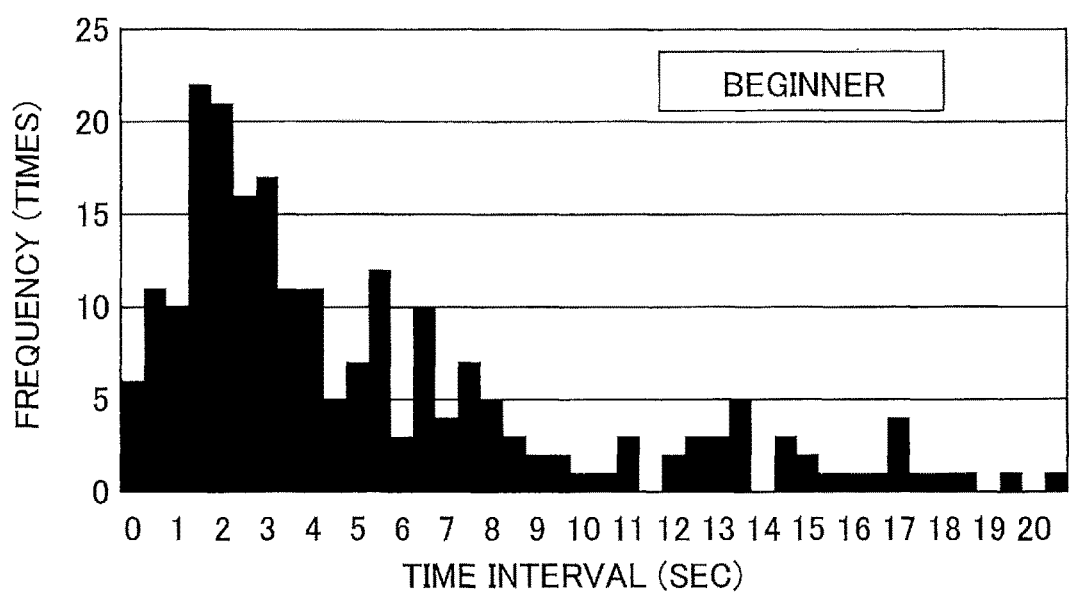
FIG. 7 shows a frequency distribution example of time intervals of key manipulations by a beginner.
Figure 8:
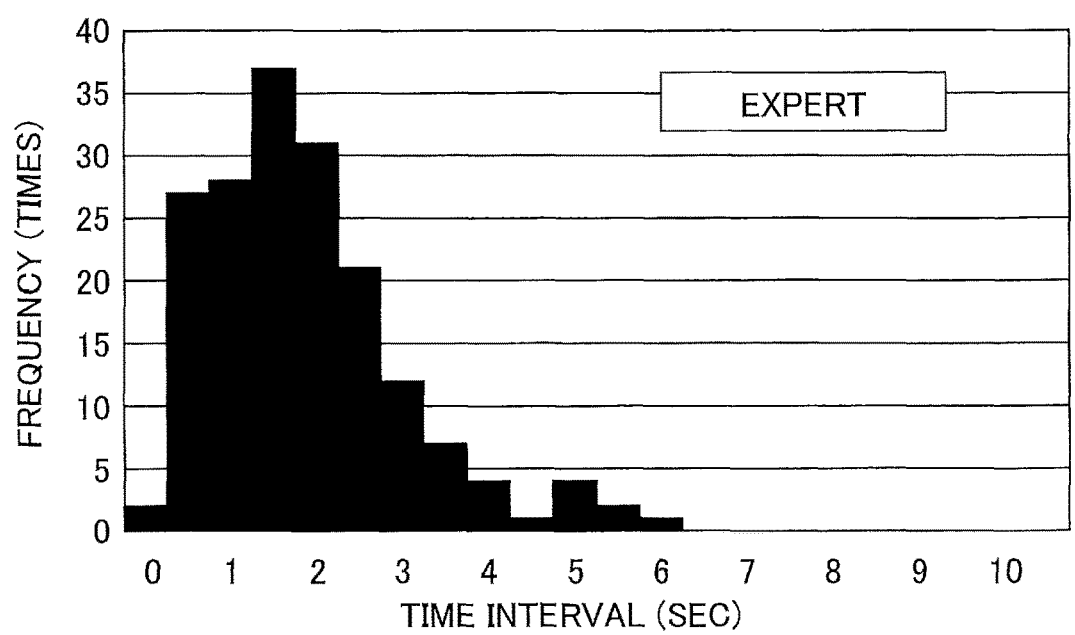
FIG. 8 shows a frequency distribution example of time intervals of key manipulations by an expert.
Figures 9, 10, 11:
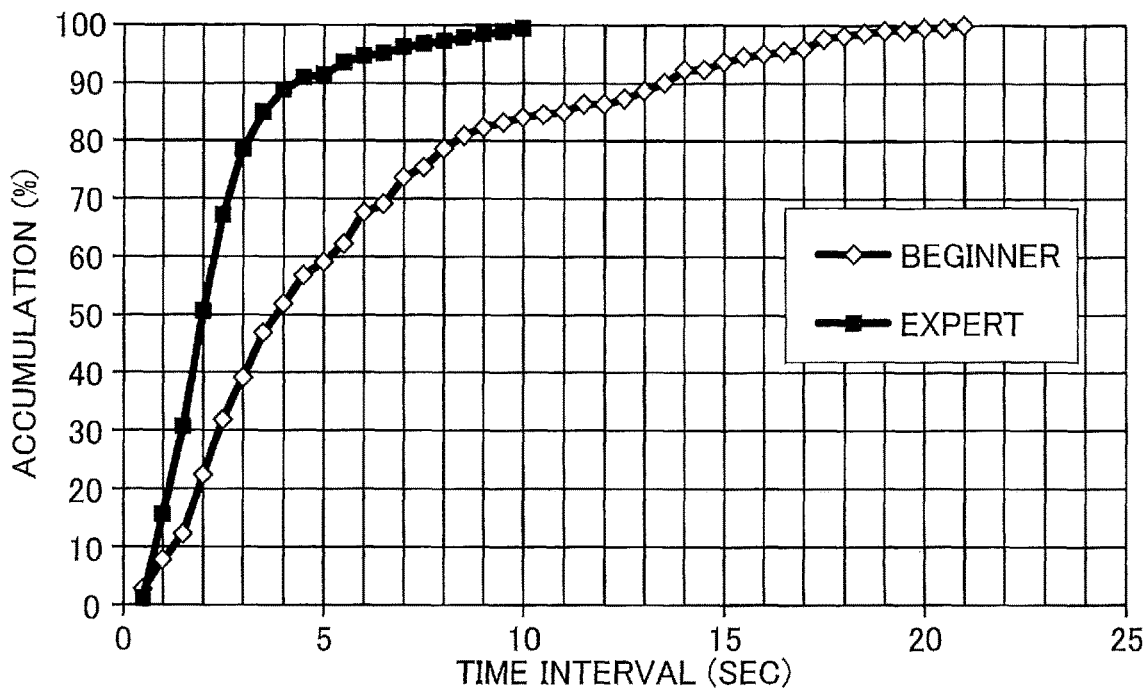
FIG. 9 shows a cumulative distribution example of time intervals of key manipulations.
FIG. 10 shows an example of cumulative probability.
FIG. 11 shows an example of the determination of a proficiency index.

In describing the method of calculating the proficiency index, first, the frequency distribution of the expert and the beginner regarding the time intervals of the key manipulations will be described. FIG. 7 shows a frequency distribution example of time intervals of key manipulations by a beginner, and FIG. 8 shows a frequency distribution example of time intervals of key manipulations by an expert. FIG. 9 shows a cumulative distribution created based on FIG. 7 and FIG. 8.

The difference between the expert and the beginner is understood as shown in FIG. 9 and FIG. 10. That is, as shown in FIG. 10, the 50% value is 3.7 seconds for beginners, 2 seconds for experts, and the 90% value is 13.5 seconds for beginners and 4 seconds for experts. In this regard, in the present embodiment, the variance value is determined to be the main parameter for work efficiency, and the variance value V(x) is used as an evaluation scale of the proficiency index. The variance value V(x) is calculated using the following equation (1).

[Equation 1]

$$V(x) = E(x - E(x))^2 = \frac{1}{n}\sum_{i=1}^{n} E(x - E(x))^2 \quad (1)$$

In the above equation (1), V(x) is the variance value of the sample, E(x) is the average value of the sample, and N is the number of samples.

FIG. 11 shows the average value of the sample and the variance value calculated using the equation (1) for each of the beginner and the expert. As the proficiency index of the processed task, for example, using a 5-step evaluation, if the variance value is 11.8, the index is defined as 1, and if the variance value is 4.2, the index is defined as 5. By linearly approximating the proficiency index with the variance value, the following equation (2) is obtained as an equation for obtaining the proficiency index from the variance value.

$$y = -0.53x + 7.26 \quad (2)$$

In the above equation (2), x is the variance value and y is the proficiency index. For example, if the variance value obtained from the manipulation log of a certain operator is 8, the proficiency index of the operator is given by 3 (=−0.53×8+7.26).

The log analysis unit 200, for example, periodically obtains the variance values of the beginner and the expert based on the manipulation log, and updates the equation (2).

The method of calculating the proficiency index (skill level) previously described is merely an example. As an example of a calculation method other than the method of calculating the proficiency index previously described, the following Examples a to d will be described. Also, the Examples a to d may be applied in any combination. Furthermore, any of Examples a to d may be applied in combination with the method of calculating the index previously described.

Example a) In Example a, a manipulation log of a super-expert (both accurate and efficient) is stored in the log file storage unit 500 in advance as best practice. The log analysis unit 200 determines the skill level of the operator by comparing the manipulation log of the operator, whose skill level will be determined, with the best practice.

As a determination method in that case, there are a method of determining the skill level by comparing each input item (1 field) and a method of determining the skill level by comparing each screen, by the log analysis unit 200. Furthermore, since an error occurs in one item/one screen, the log analysis unit 200 may determine the skill level by integrating the comparison results in the latest n-time screen manipulations and item manipulations.

In the case of determining the skill level by integrating the latest n times, a method of averaging the comparison results of the manipulations log of n times before, (n−1) times before, (n−2) times before . . . the previous time before may be used, or a method of taking a weighted average by decreasing the weighting of the comparison result in order from the manipulation log of n times before to the previous manipulation log may be used.

Example b) In Example b, the best practice described in Example a is held in the log file storage unit 500 as a default setting. While the manipulation log of the operator is being accumulated in the log file storage unit 500, the best practice is dynamically remade (replaced) when the manipulation log of the accurate and efficient super-expert is obtained that exceeds the best practice of default setting. Then the skill level is calculated with the remade best practice.

Example c) In Example c, while the manipulation log of the operator is being accumulated in the log file storage unit 500 without setting the best practice, the log analysis unit 200 learns the relationship between a skill affecting factor and the skill level from the manipulation log, and determines the skill level automatically using a learning model obtained by the learning. Furthermore, Example c may be applied in combination with a method of using the best practice.

Specifically, the manipulation log of the expert and the manipulation log of the beginner are given to the log analysis unit 200 as teacher data. The log analysis unit 200 creates a learning model by learning with a DNN (Deep Neural Network) based on the teacher data, and stores the learning model in the log information analysis data unit 600. Then, the log analysis unit 200 outputs the skill level by inputting the manipulation log of the operator to be determined into the learning model.

Example d) In operation work for manipulating based on a request from a user, it is assumed that an operator is being skilled on two axes of skill with the system and skill with the work. In Example d, when determining the skill level, the skill level is determined based on the above assumption.

Specifically, as a material for determining the skill level from the manipulation log, the log analysis unit 200 uses an input speed, an interval up to input start, a mouse track, and the like for the skill level with respect to the system, and uses an input order, a degree of coverage of essential input items, a question/response to the preprocessor when preprocessing is required, a question/response from the postprocessor when postprocessing is required, and the like for the skill level with respect to the work.

The log analysis unit 200 calculates the skill level with respect to the system and the skill level with respect to the work by the method of calculating the proficiency index previously described (for example, comparison with the best practice), using the material for determining. As an example, the input speed of the best practice is compared with the input speed of the operator to be determined, and the skill level with respect to the system is calculated based on the difference. Furthermore, as an example, the input order of the best practice is compared with the input order of the operator to be determined, and the skill level with respect to the work is calculated based on the number of times of the order being different from the input order of the best practice or the like.

Figure 12:
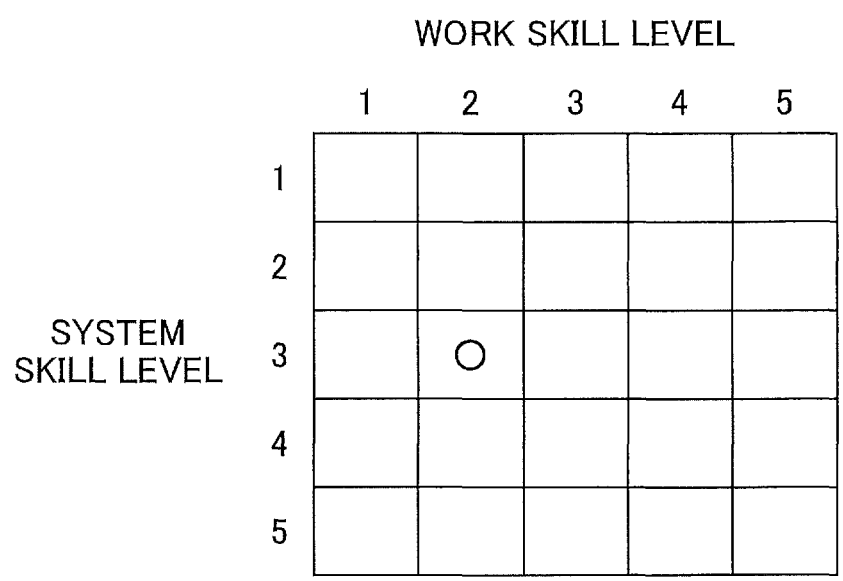
FIG. 12 shows an example of a matrix of system skill level and work skill level.

For example, the log analysis unit 200 maps the determined system skill level and work skill level to a matrix (an example is shown in FIG. 12) with the system skill level as a vertical axis and the work skill level as a horizontal axis. In the example of FIG. 12, as an example, there is illustration of the data of the system skill level=3 and the work skill level=2 being mapped.

A number of skill-building processes may be considered from a low state with respect to both of vertical and horizontal at the top left to a high state with respect to both of vertical and horizontal at the bottom right of FIG. 12. The shortest skill-building process may be realized by adding appropriate annotations to the interface according to each process.

Next, in S111, the log analysis unit 200 updates the content of the proficiency index storage unit 300 for the operator using the calculated proficiency index value.

In the subsequent manipulation, the interface is selected using the updated latest proficiency index. For example, when the proficiency index before the update is 3, if the updated proficiency index is 4~5, an interface with higher difficulty is set, or if the updated proficiency index is 1~2, an interface with lower difficulty is set. If the proficiency index is 3, the current interface is set.

Hereinafter, Embodiment 1 and Embodiment 2 will be described as more detailed examples of the interface displayed on the operation unit 101. Furthermore, Embodiment 3 will be described as an embodiment related to the method of generating an interface related to Embodiment 1 and Embodiment 2. Furthermore, Embodiment 4 and Embodiment 5 will be described as other examples. Also, Embodiment 1 to Embodiment 5 may be applied in any combination. Furthermore, any of the processing described in Embodiment 1 to Embodiment 5 may be applied in combination with the processing of the adaptive interface providing apparatus 100 described so far.

Embodiment 1

In Embodiment 1, an annotation will be described as an example of an interface to be displayed on the manipulation unit 101 in S105 of the flow of FIG. 3.

In Embodiment 1, the UI generation unit 400 achieves the adaptive interface to be displayed to the operator by adding the annotation without changing the target interface. The advantage of this method is that all operators can use the base interface in common, without modifying the system including the target interface.

For example, specific annotations include adding a tag to an input item to support understanding a business, displaying a highlight of an essential input item to support improving manipulation accuracy, listing the input items to support improving manipulation efficiency, and the like.

Embodiment 2

In Embodiment 2, a change of the interface will be described as an example of UI to be displayed on the manipulation unit 101 in S105 of the flow of FIG. 3.

In Embodiment 2, the UI generation unit 400 changes the target interface, and makes the operator input from the changed interface so as to indirectly input to the target interface. This allows an adaptive interface to be displayed to the operator. The advantage of this method is that optimization can be performed at the layout level for each operator.

For example, an addition of a cautionary note to support understanding a business, an addition of automatic input function to support improving manipulation accuracy, and a change of the display order to support improving manipulation efficiency, or the like are included as the specific changed interface.

Embodiment 3

The UI generation unit 400 determines the candidate for annotation or the candidate for the content of change of the interface in Embodiment 1 and 2 by the past manipulation log.

For example, in the case of adding the tag to the input item or adding the cautionary note, the UI generation unit 400 finds a part where the operator's hand tends to stop or a part where a mistake easily occurs, from the elapsed time from one input item to the next input item or the number of errors or the like. Then the UI generation unit 400 determines these parts as display parts of the tag or the cautionary note.

For example, in the case of displaying the highlight of the essential input item or adding the automatic input function, the UI generation unit 400 analyzes the correlation from the input content and the input order of the items, and finds an item which always has the same input, an item being essential input depending on the input content of other items, or an item whose input content is automatically determined. The UI generation unit 400 can display the highlight of the essential input item or add the automatic input function for the found items.

Furthermore, for example, in the case of listing the input items, the UI generation unit 400 determines the options to be listed from the tabulation of the input content of the items. Also, for example, the UI generation unit 400 determines the change of the display order according to the input order.

The UI generation unit 400 calculates and learns the annotation or the content of the change of the interface based on the manipulation logs of all the operators recording the manipulation log. This allows the influence of individual habits and mistakes to be reduced, and the manipulation log is collected in a short time.

The UI generation unit 400 holds the group of candidates for the annotation or the change of the interface generated by the manipulation log. The UI generation unit 400 determines what should be provided to the operator according to the proficiency index of the operator. The group of candidates is updated sequentially as the manipulation logs are accumulated. In other words, the interface to be displayed to the operator is dynamically generated.

Embodiment 4

As a further embodiment, an annotation with the fastest degree (most effective) of improvement of the proficiency index may be searched for and displayed by learning from a number of manipulation logs.

Specifically, the log analysis unit 200 extracts a factor affecting the skills of the operator (manipulation is taking a long time, redo of manipulation is occurred, etc.) from the manipulation log of the operator stored in the log file storage unit 500. The UI generation unit 400 searches for, based on the past data of the combination of the manipulation log and the interface displayed in the past (specifically, for example, an annotation), an interface (specifically, for example, an annotation) regarding the extracted factor which is most effective for improving the factor by learning, then displays the interface (specifically, for example, an annotation).

For example, the annotations include annotations to be displayed in advance, to be displayed at the timing desired to alert, to be displayed when the mouse or attention (movement of the line of sight, etc.) is moved to a specific location, indicating the order of input, indicating an essential input item (field), making frequently occurring free description content into selection items, and the like. For example, the method of indicating the order or indicating the essential input item (field) specifically includes methods such as coloring, indicating the order by number, surrounding the field, changing the size of the field to stand out.

An input rule may be derived in the log analysis unit 200 from the manipulation log accumulated in the log file storage unit 500, instead of holding the content to be displayed in the UI generation unit 400 in advance. The content to be displayed may be generated according to the content of the rule.

Specifically, first, the log analysis unit 200 extracts the input rule from the manipulation log of the operator accumulated in the log file storage unit 500. For example, the input rules include, "Many people input numbers in this field.", "Many people input 9-digit numbers in this field.", "When inputting a certain field, another certain field is required to be input.", "When an input of a certain field is A, there is a correlation that the input of another certain field is B.", and the like.

The UI generation unit 400 generates content to be displayed according to the input rule extracted from the manipulation log, and displays the generated content to be displayed on the manipulation unit 101. The content to be displayed generated by the UI generation unit 400 may be referred to as "interface".

For example, in response to the input rule that many people input 9-digit numbers in a certain field, the UI generation unit 400 generates the content to be displayed in advance such as alerting "This input field is usually of 9 digits." or alerting "Is the number of digits correct?" in a case of 9 digits not being inputted in this field.

Furthermore, for example, in response to the input rule that when an input of a certain field is A, there is a correlation that the input of another certain field is B, regarding the another certain field, the UI generation unit 400 generates the content to be displayed in advance such as alerting "This input is highly likely to be B" or alerting "Shouldn't this input be B?" in a case of something other than B being inputted.

Regarding the kind of displayed content to be generated corresponding to the input rule, for example, the content to be displayed with the fastest degree of improvement of the proficiency index by learning may be generated, applying Embodiment 4.

(How to Use the Manipulation Log)

As an example of the method of using the manipulation log other than determining the skill level of the operator from the acquired and accumulated manipulation log and giving the annotation (alerting) according to the skill level, Method 1 and Method 2 will be described below.

Method 1) Method 1 is a method of adding a rule about many operators being prone to make an error (prone to worry about).

Specifically, the log analysis unit 200 analyzes items such as many operators making an error, worrying, requesting to redo work from the operators before and after in the process of log acquisition and accumulation regarding the manipulation log stored in the log file storage unit 500, and notifies the system administrator of the extracted items. The system administrator defines a check rule for the manipulation corresponding to the notified item, and manually adds the check rule to improve the accuracy and efficiency of the operator's manipulation.

Furthermore, regarding the extracted items, the system may automatically define a check rule for the manipulation corresponding to the extracted items and add a check rule to improve the accuracy and efficiency of the operator.

Method 2) Method 2 is a method of using an improvement requirement when the system is repaired by renewing the system.

Specifically, the log analysis unit 200 analyzes content such as many operators likely making an error, including many questions, inquiries, requests of redoing work from the operators before and after in the acquired and accumulated manipulation log regarding the manipulation log stored in the log file storage unit 500. Then the log analysis unit 200 outputs the extracted content and the like from the manipulation unit. Based on this output result, it is used as an improvement requirement when creating a new system or repairing the system by renewing the system.

(Summary of Embodiments)

As was previously described, according to the present embodiments, an adaptive interface providing apparatus which has a manipulation unit for receiving a request from a user and provides an interface to be displayed on the manipulation unit comprises a proficiency index calculating unit configured to calculate a proficiency index of the user based on a manipulation log of the user; and an interface providing unit configured to generate an interface suitable for the user based on a manipulation log of each user and the proficiency index and to display the interface on the manipulation unit.

The log analysis unit 200 is an example of the proficiency index calculating unit, and the UI generation unit 400 and the log analysis unit 200 are examples of the interface providing unit.

For example, the proficiency index calculating unit calculates the proficiency index based on a variance value of time intervals of key manipulations performed by the user.

The proficiency index calculating unit may calculate the proficiency index using a functional relationship between the proficiency index and a variance value, which is obtained from a variance value of time intervals of key manipulations by a beginner and a variance value of time intervals of key manipulations by an expert.

The proficiency index calculating unit may calculate the proficiency index based on a comparison between the manipulation log of the user and the manipulation log of a user with a high proficiency level.

The proficiency index calculating unit may learn a relationship between a factor affecting skill and a proficiency index from a manipulation log, and may calculate the proficiency index using a learning model obtained by the learning.

The proficiency index calculating unit may calculate both a proficiency index with respect to the system and a proficiency index with respect to work as the proficiency index.

The interface providing unit may hold a group of candidates of the interface, and the group of candidates may be classified into an interface for supporting understanding of a business, an interface for improving manipulation accuracy, and an interface for improving manipulation efficiency. The interface providing unit may determine an interface corresponding to the proficiency index of the user from the classified interfaces.

The adaptive interface providing apparatus may comprise a unit configured to extract a factor affecting skills of the user from the manipulation log of the user accumulated in a storing unit. The interface providing unit may determine a most effective interface for improving the factor by learning based on past data of a combination of a manipulation log and an interface displayed in the past.

Furthermore, the interface providing unit may learn, search, and display an annotation having the fastest degree (most effective) of improvement of the proficiency index from a number of manipulation logs.

Furthermore, the adaptive interface providing apparatus may comprise a unit configured to extract an input rule from the manipulation log of the user accumulated in a storing unit. The interface providing unit may generate an interface corresponding to the input rule.

Furthermore, according to the present embodiments, a method of providing an adaptive interface executed by an adaptive interface providing apparatus which has a manipulation unit for receiving a request from a user and provides an interface to be displayed on the manipulation unit comprises calculating a proficiency index of the user based on a manipulation log of the user; generating an interface suitable for the user based on the manipulation log of each user and the proficiency index; and displaying the interface on the manipulation unit.

At least the following matters are disclosed in the specification.

(Clause 1)

An adaptive interface providing apparatus which has a manipulation unit for performing input/output manipulation by an operator and provides an interface to be displayed on the manipulation unit, comprising:

a proficiency index calculating unit configured to calculate a proficiency index of the operator based on a manipulation log of the operator; and an interface providing unit configured to generate an interface suitable for the operator based on a manipulation log of each operator and the proficiency index and to display the interface on the manipulation unit.

(Clause 2)

The adaptive interface providing apparatus according to clause 1, wherein the proficiency index calculating unit calculates the proficiency index based on a variance value of time intervals of key manipulations performed by the operator.

(Clause 3)

The adaptive interface providing apparatus according to clause 2, wherein the proficiency index calculating unit calculates the proficiency index of the operator using a functional relationship between the proficiency index and a variance value, which is obtained from a variance value of time intervals of key manipulations by a beginner and a variance value of time intervals of key manipulations by an expert.

(Clause 4)

The adaptive interface providing apparatus according to any one of clauses 1 to 3, wherein the interface providing unit holds a group of candidates of the interface, the group of candidates is classified into an interface for supporting understanding of a business, an interface for improving manipulation accuracy, and an interface for improving manipulation efficiency, and wherein the interface providing unit determines an interface corresponding to the proficiency index of the operator from the classified interfaces.

(Clause 5)

A method of providing an adaptive interface executed by an adaptive interface providing apparatus which has a manipulation unit for performing input/output manipulation by an operator and provides an interface to be displayed on the manipulation unit, the method comprising:

calculating a proficiency index of the operator based on a manipulation log of the operator;

generating an interface suitable for the operator based on the manipulation log of each operator and the proficiency index; and displaying the interface on the manipulation unit.

(Clause 6)

A program for causing a computer to function as each of the units in the adaptive interface providing apparatus according to any one of clauses 1 to 4.

The present invention is not limited to such specific embodiments as was previously described, and various modifications and changes can be made within the scope of the gist of the present invention described in the claims.

This patent application claims priority based on Japanese Patent Application No. 2018-060718 filed on Mar. 27, 2018 and Japanese Patent Application No. 2018-134390 filed on Jul. 17, 2018, and the entire contents of Japanese Patent Application No. 2018-060718 and Japanese Patent Application No. 2018-134390 are incorporated into this patent application.

REFERENCE SIGNS LIST

100 adaptive interface providing apparatus
101, 102 manipulation unit
200 log analysis unit
300 proficiency index storage
400 UI generation unit
500 log file storage unit
600 log information analysis data unit
150 drive device
151 storage medium
152 auxiliary storage device
153 memory device
154 CPU
155 interface device
156 display device
157 input device

The invention claimed is:

1. An adaptive interface providing apparatus for receiving a request from a user and displaying an interface, comprising:

a memory; and a processor coupled to the memory and configured to:

calculate a proficiency index of a first user based on a manipulation log of the first user;

select from a set of user interface candidates, based on the proficiency index, a user interface, wherein the selected user interface is associated with a class including a level of accuracy of input by the first user, the proficiency index is based on a learning model obtained by learning a relationship between a factor affecting skill and a preexisting proficiency index from a preexisting manipulation log, the set of user interface candidates includes a plurality of user interfaces associated with combinations of task identifiers, feature type identifiers, and proficiency indices based on manipulation logs of a plurality of users, the plurality of users includes the first user and a second user, and the first user and the second user are distinct, wherein each user interface candidate of the set of user interface candidates is classified according to a plurality of classes, the plurality of classes including:

an interface for supporting understanding of a business, an interface for improving manipulation accuracy, and an interface for improving manipulation efficiency, ccdisplay the selected user interface for the first user;

update a manipulation log of the second user of the plurality of users, based on respective input manipulation of information by the second user of the plurality of users performing a task associated with a combination of a task identifier and a feature type identifier;

dynamically update, based on the manipulation log of the second user of the plurality of users, a feature of a user interface candidate of the set of user interface candidates associated with the task identifier and the feature type identifier by automatically changing on one or more of the user interface candidates at least one of:
displaying an annotation,
displaying a highlight of an essential input item, or adding an automatic input function;
recalculate the proficiency index of the first user based on an updated manipulation log of the first user; and
in response to the dynamically updated feature of the user interface candidate based on the manipulation log of the second user, dynamically update the selected user interface currently displayed to the first user to a user interface for the first user from the updated set of user interface candidates based on the recalculated proficiency index of the first user.

2. The adaptive interface providing apparatus according to claim 1, wherein the proficiency index of the first user is based on a variance value of time intervals of key manipulations performed by the first user.

3. The adaptive interface providing apparatus according to claim 2, wherein the proficiency index of the first user is based on a functional relationship between the proficiency index and a variance value, which is obtained from a variance value of time intervals of key manipulations by a beginner and a variance value of time intervals of key manipulations by an expert.

4. The adaptive interface providing apparatus according to claim 1, wherein the proficiency index of the first user is based on a comparison between the manipulation log of the first user and the manipulation log of the second user with a high proficiency level.

5. The adaptive interface providing apparatus according to claim 1, wherein the proficiency index is based on a learning model using a neural network.

6. The adaptive interface providing apparatus according to claim 1, wherein the proficiency index is based on a combination of a proficiency index with respect to system and a proficiency index with respect to work.

7. The adaptive interface providing apparatus according to claim 1, wherein the processor further extracts a factor affecting skill of the first user from the manipulation log of the first user accumulated in a store, and wherein the interface causes improving the factor by learning based on past data of a combination of a manipulation log and an interface displayed in the past.

8. The adaptive interface providing apparatus according to claim 1, wherein the processor further extracts an input rule from the manipulation log of the first user accumulated in a store, and wherein the interface corresponds to the input rule.

9. A non-transitory computer-readable recording medium having a program embodied therein for causing a computer to function as the adaptive interface providing apparatus according to claim 1.

10. A method of providing an adaptive interface executed by an adaptive interface providing apparatus for receiving a request from a user and displaying an interface, the method comprising:

calculating a proficiency index of a first user based on a manipulation log of the first user;
selecting from a set of user interface candidates, based on the proficiency index, a user interface, wherein the selected user interface is associated with a class including a level of accuracy of input by the first user, the proficiency index is based on a learning model obtained by learning a relationship between a factor affecting skill and a preexisting proficiency index from a preexisting manipulation log, the set of user interface candidates includes a plurality of user interfaces associated with combinations of task identifiers, feature type identifiers, and proficiency indices based on manipulation logs of a plurality of users, the plurality of users includes the first user and a second user, and the first user and the second user are distinct,
wherein each user interface candidate of the set of user interface candidates is classified according to a plurality of classes, the plurality of classes including:
an interface for supporting understanding of a business,
an interface for improving manipulation accuracy, and
an interface for improving manipulation efficiency,
displaying the selected user interface for the first user;
updating a manipulation log of the second user of the plurality of users, based on input manipulation of information by the second user of the plurality of users performing a task associated with a combination of a task identifier and a feature type identifier;
dynamically updating, based on the manipulation log of the second user of the plurality of users, a feature of a user interface candidate of the set of user interface candidates associated with the task identifier and the feature type identifier by automatically cha nging one or more of the user interface candidates at least one of:
displaying an annotation,
displaying a highlight of an essential input item, or adding an automatic input function;
recalculate the proficiency index of the first user based on an updated manipulation log of the first user; and
in response to t he dynamically updated feature of the user interface candidate based on the manipulation log of the second user, dynamically updating the selected user interface currently displayed to the first user to a user interface for the first user from the updated set of user interface candidates based on the recalculated proficiency index of the first user.

11. The method according to claim 10, further comprising: updating the manipulation log of the first user based on input manipulation of information by the first user;
updating, based on the updated manipulation log of the first user, the proficiency index of the first user; and
dynamically updating, based on the updated proficiency index of the first user, the interface using on a selection of a user interface candidate from the set of user interface candidates.

* * * * *